(12) United States Patent  (10) Patent No.: US 9,118,356 B2
Michalske et al.  (45) Date of Patent: Aug. 25, 2015

(54) DATA TRANSPORT IN PORTABLE ELECTRONIC DEVICES

(71) Applicant: Apple Inc., Cupertino, CA (US)

(72) Inventors: Steven C. Michalske, Sunnyvale, CA (US); William P. Cornelius, Saratoga, CA (US); Neal V. Cecil, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 121 days.

(21) Appl. No.: 13/843,253

(22) Filed: Mar. 15, 2013

(65) Prior Publication Data

US 2014/0235163 A1 Aug. 21, 2014

Related U.S. Application Data

(60) Provisional application No. 61/766,693, filed on Feb. 19, 2013.

(51) Int. Cl.
H04B 5/00 (2006.01)

(52) U.S. Cl.
CPC ............ H04B 5/0031 (2013.01); H04B 5/0037 (2013.01)

(58) Field of Classification Search
USPC ............. 455/41.1, 41.2, 73, 81, 575.1, 575.3, 455/347, 349; 343/700 MS, 762
See application file for complete search history.

(56) References Cited

U.S. PATENT DOCUMENTS

| 5,917,968 | A  | 6/1999  | Wood |
| 7,272,277 | B2 | 9/2007  | Ruiz |
| 7,374,424 | B1 | 5/2008  | Nurmi et al. |
| 7,812,775 | B2* | 10/2010 | Babakhani et al. ........... 343/754 |
| 7,860,473 | B2 | 12/2010 | Hardacker et al. |
| 7,899,407 | B2* | 3/2011 | Rofougaran .................... 455/73 |
| 7,949,310 | B2* | 5/2011 | Rofougaran .................... 455/81 |
| 7,962,186 | B2* | 6/2011 | Cui et al. .................... 455/575.7 |
| 8,005,437 | B2* | 8/2011 | Rofougaran .................... 455/76 |
| 8,170,497 | B2* | 5/2012 | Rofougaran .................... 455/73 |
| 8,351,982 | B2 | 1/2013 | Rofougaran |
| 8,909,170 | B2* | 12/2014 | Rofougaran .................... 455/81 |

(Continued)

FOREIGN PATENT DOCUMENTS

| EP | 2026381 A2 | 2/2009 |
| KR | 1020090030311 | 3/2009 |
| WO | 2012175629 A1 | 12/2012 |

OTHER PUBLICATIONS

International Search Report and Written Opinion mailed Apr. 28, 2014 in PCT/US2013/075360.

*Primary Examiner* — Tuan A Tran
(74) *Attorney, Agent, or Firm* — Downey Brand LLP

(57) ABSTRACT

The described embodiments relate generally to a dielectric wave guide interconnect for an electronic device including a first routing circuit, a second routing circuit, and a dielectric wave guide coupling the first routing circuit to the second routing circuit. The interconnect may also include a first coupling element securing a first end of the dielectric wave guide proximal to the first routing circuit and a conductive element to insulate the dielectric wave guide from radio-frequency (RF) signals. In some embodiments, the first routing circuit is in a bottom portion of the electronic device; and the second routing circuit is in a top portion of the electronic device. An electronic device including a dielectric wave guide interconnect as above is also disclosed. A coupler for an electronic device including a first end adapted to receive an electrical signal and a propagating electromagnetic signal is also disclosed.

14 Claims, 14 Drawing Sheets

(56) References Cited

U.S. PATENT DOCUMENTS

| | | |
|---|---|---|
| 2004/0227580 A1 | 11/2004 | Otsuka et al. |
| 2012/0114052 A1 | 5/2012 | Haartsen |
| 2012/0230697 A1 | 9/2012 | Ji |
| 2013/0049883 A1 | 2/2013 | Ma et al. |
| 2013/0064311 A1* | 3/2013 | Turner et al. .................. 375/259 |
| 2013/0266026 A1* | 10/2013 | McCormack et al. ........ 370/474 |

* cited by examiner

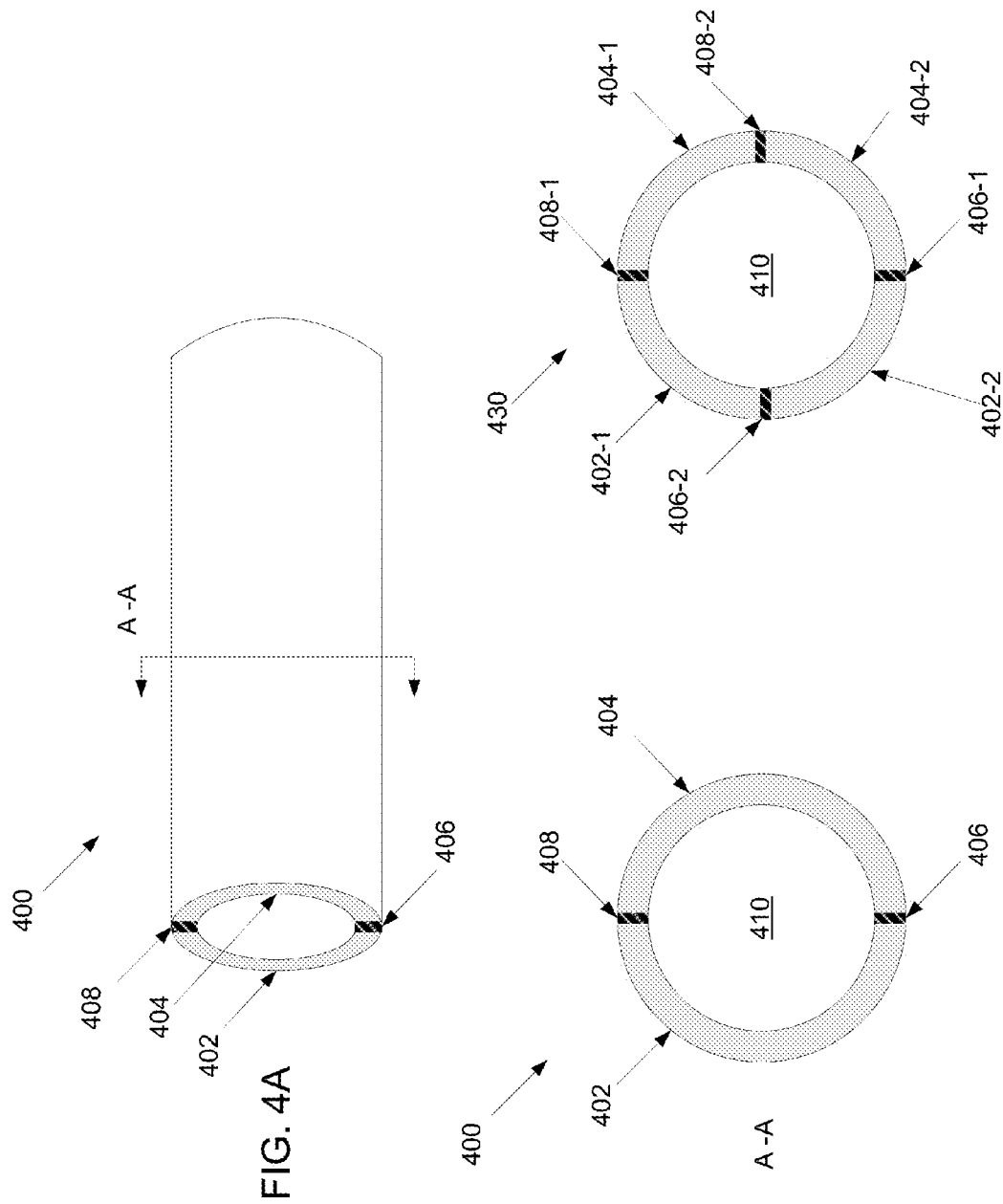

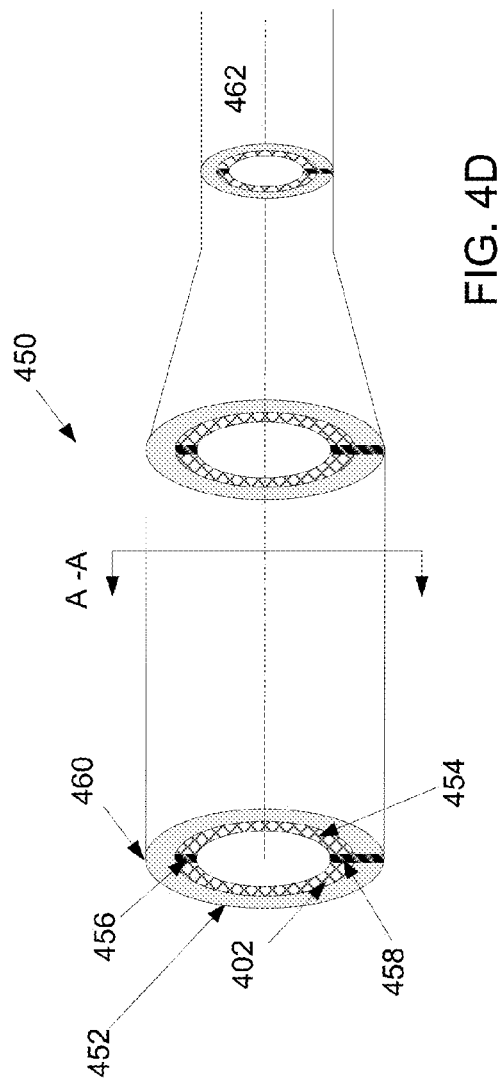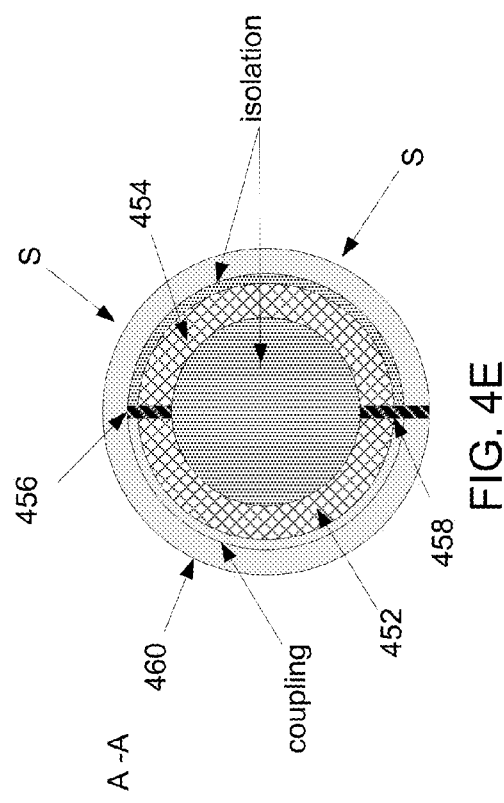

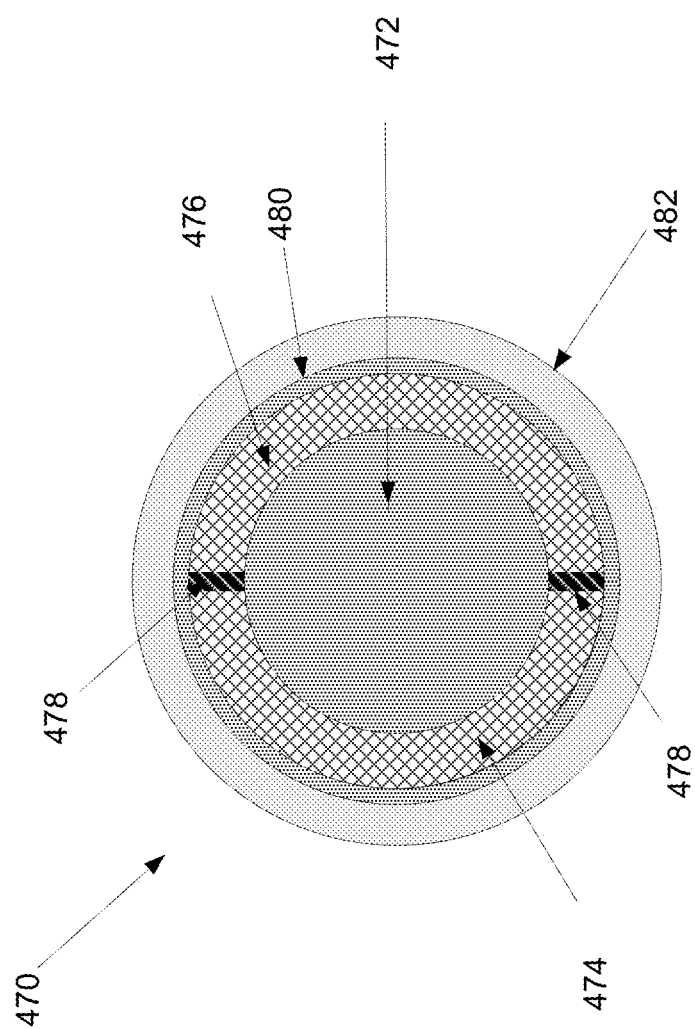

DATA TRANSPORT IN PORTABLE ELECTRONIC DEVICES

CROSS REFERENCE TO RELATED APPLICATIONS

This U.S. application claims priority under 35 U.S.C. 119 (e) to U.S. Provisional Patent Application No. 61/766,693, filed Feb. 19, 2013 and entitled "DIELECTRIC WAVE GUIDE INTERCONNECT FOR ELECTRONIC DEVICES" by MICHALSKE et al., that is incorporated by reference in its entirety for all purposes.

FIELD OF THE DESCRIBED EMBODIMENTS

The described embodiments relate generally to portable electronic devices, and in particular, using electromagnetic energy having a carrier frequency in the sub-THz to THz range for high speed data transport.

BACKGROUND

In the field of electronic devices, the availability of high end display devices has become an industry standard. As a result, the complex data management and signaling schemes for state-of-the-art video systems has increased the demand for faster and more reliable data transport. Electric cables using metal conductors such as copper are used to pass data between transmitter (Tx) and receiver (Rx) components. However, at the required data rates, an exposed metal conductor acts as an antenna capable of propagating electromagnetic energy at frequencies that interfere with co-operating wireless circuits within the device. For example, cable interconnects have the capability of emitting (incidental) electromagnetic energy at frequencies that interfere with nearby wireless RF circuits (such as WiFi or Bluetooth). This interference can be particularly troublesome in small form factor computing devices such as a laptop computer. For example, incidental energy generated by metal conductors can couple with a nearby WiFi antenna resulting in reduced WiFi performance. In order to prevent such affects, expensive shielding or re-location of the sensitive circuits, or both, can be used to isolate the sensitive circuits from the incidental energy. Moreover, in addition to acting as an antenna, metal conductors experience metal fatigue induced by repeated bending (during opening and closing of a lid of a laptop, for example). The metal fatigue results in damage to metal conductors (such as breaking) with the resultant loss of device functionality and reduced reliability.

One approach that is used to avoid the problems associated with using an unshielded or only partially shielded metal conductor for high speed data transport in small form factor electronic devices, and more particularly laptop computers, relies upon optical wave guides, and more particularly, fiber optic cables. Although, fiber optic cables eliminate the problems of incidental electromagnetic energy and metal fatigue, a photonic communication system that relies upon fiber optics generally requires a much more complex and expensive suite of circuits. For example, in order to generate optical signals, extra circuitry for lasers are required at a transmitter (Tx) portion of a fiber optic cable. Likewise, a photo-detector circuit (and amplifier) is required in a receiver (Rx) portion of the fiber optic cable. Moreover, power consumption used to operate the photonic communication system can be substantial. In portable systems that rely upon a battery for operating power, the increase power consumption reduces battery life. In addition to increased power consumption, manufacturing can be adversely affected since photonic based circuitry is not easily made compatible with the silicon-based integrated circuits (ICs). Furthermore, in order to minimize transmission loss, alignment precision of a few tens or hundreds of microns is required between electronic components and any fiber optic cable. Precision of this magnitude can substantially increase manufacturing complexity and reduce resultant yield loss with a concomitant increase in overall manufacturing cost.

A reliable and cost effective high speed data transport system for use in a portable computer is desired.

SUMMARY OF THE DESCRIBED EMBODIMENTS

According to embodiments disclosed herein, a speed data system for use in a portable computing device is disclosed. The high speed data system includes at least a first circuit communicating with a second circuit. The first circuit includes a data source configured to provide data, and a near field transmitter circuit coupled to the data source and configured to transmit electromagnetic energy (EM) encoded with at least some of the data, the electromagnetic energy having a carrier frequency of at least 60 GHz to several hundred GHz. The second circuit includes at least a receiver circuit separated from the near field transmitter and configured to receive the data provided by the near field transmitter circuit. A data sink is coupled to the receiver circuit configured to receive and process the received data.

Another embodiment teaches a method for assembly of a computing system having a first component having a near field transmitter circuit and a second component having a near field receiver circuit. The method is carried out by forming a high speed near field data transport channel between the first component and the second component by locating the near field transmitter circuit and the near field receiver circuit a pre-determined distance apart from each other within a chassis. The pre-determined distance corresponds to a distance of less than a wavelength to a few wavelengths over which electromagnetic energy encoded with data is transmitted. The first component and the second component are secured to the chassis after the high speed data channel is formed.

A portable computing system is also disclosed. The portable computing system can include at least a base unit, and a lid pivotally connected to the base unit by a hinge assembly. The base unit includes a data source arranged to provide data, a near field transmitter coupled to the data source and configured transmit electromagnetic energy (EM) encoded with at least some of the data provided by the data source, the EM having a carrier frequency of at least 60 GHz up to several hundred GHz or more. The lid includes a data sink arranged to process at least some of the data provided by the data source. The portable computing system includes a flexible wave guide disposed within the hinge assembly. The flexible wave guide includes a first end having a receiver circuit configured to receive at least some of the EM transmitted by the near field transmitter where the first end is free to pivot with respect to the near field transmitter. The flexible wave guide includes a second end coupled to the data sink and fixed to lid. The flexible wave guide undergoes a twist event in accordance with a pivoting motion of the lid with respect to the base unit without an adverse increase in data transmission loss.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings. These drawings do not limit any changes in form and detail that may be made to the described embodiments. Any such changes do not depart from the spirit and scope of the described embodiments.

FIGS. 4A-4G show cylindrical embodiments of a wave guide.

In the figures, elements having the same or similar reference numerals include the same or similar structure, use, or procedure, as described in the first instance of occurrence of the reference numeral.

DETAILED DESCRIPTION OF SELECTED EMBODIMENTS

Figure 1:
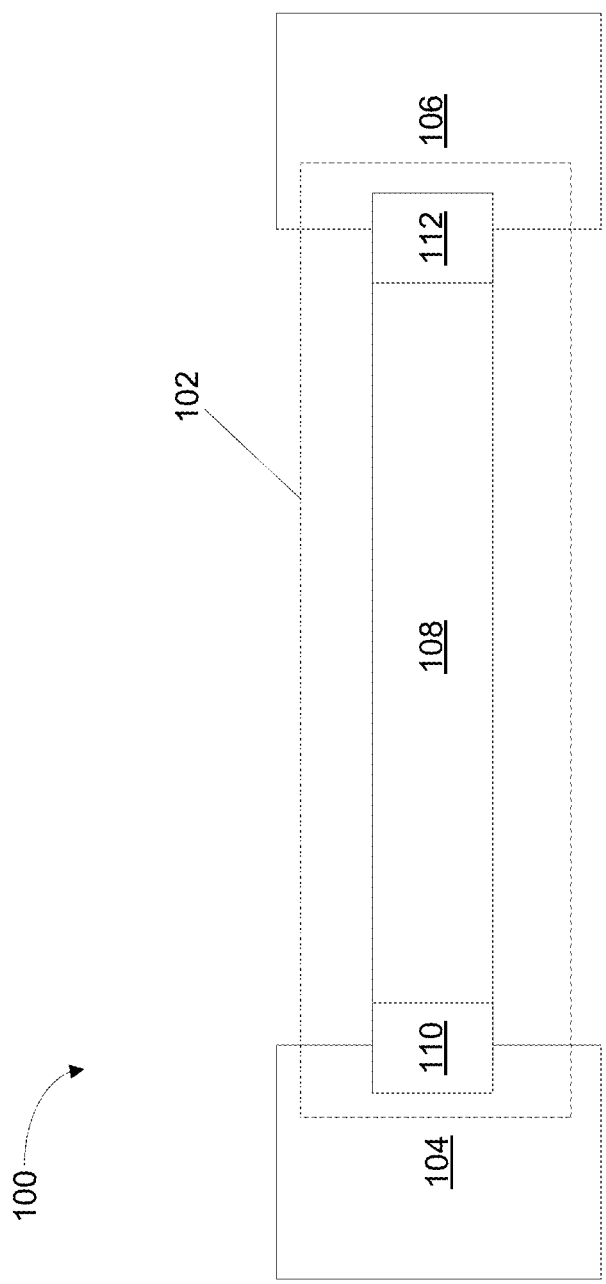
FIG. 1 illustrates a data transport system in accordance with the described embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Embodiments disclosed herein describe a high speed data transport system for use in an electronic device such as a portable computing system. In particular, the high speed data transport system can utilize electromagnetic energy having a carrier frequency in the sub-terahertz (s-THz) range (i.e., 60 GHz) and higher (i.e., terahertz, THz) with corresponding wavelengths in the range of a few millimeters. The electromagnetic energy can use a dielectric as a transmission medium, or in some cases, the electromagnetic energy can be radiated over free space (e.g., an air gap). The dielectric can form a network that includes a number of dielectric segments joined by corresponding couplers (either dielectric or metallic) over which the electromagnetic energy can pass with little or no loss. Generally speaking, a coupler can move electromagnetic energy from one wave guide to another. The coupler can be directional in nature by which it is meant that the coupler can cause the electromagnetic energy to propagate between wave guides in a preferred direction. A dielectric coupler can include a dielectric to dielectric contact in which dielectric surfaces are brought into physical contact with each other to form a junction region. In general, the dielectric surfaces exhibit surface imperfections that can result in a number of gaps in the junction region. The electromagnetic energy can nonetheless traverse the gaps since the gaps have dimensions substantially less than a wavelength. In some embodiments, the dielectric coupler can use near field coupling to propagate the electromagnetic energy through free space (such as an air gap). It should be noted that near field coupling is most effective at distances in the range of sub-wavelength to a few wavelengths.

The dielectric can rigid or flexible. A dielectric can take the form of a polymer that can be either flexible or rigid. Examples of a flexible dielectric material that can be used as a transmission medium for electromagnetic energy having a carrier frequency in the s-THz to THz range can include a polymer (such as plastic). An advantage to using a flexible wave guide is that the flexible wave guide can be bent and twisted without significant signal loss. The flexible wave guide can be used in a laptop computer having a form factor that requires high speed data transmission over a movable joint such as a hinge assembly. In this way, movements of the flexible wave guide will not result in an adverse loss of signal integrity over the operational life of the laptop. The wave guide can take many shapes such as rectangular, cylindrical, etc. It should be noted that multi-dielectric structures will have modes of propagation as set by the boundary conditions and the criteria for propagation. In some embodiments, a near field arrangement can be used to propagate the electromagnetic energy over free space using near field effects. The near field arrangement can include a transmitter structure configured to radiate electromagnetic energy over a distance of from a sub-wavelength to a few wavelengths for capture by a receiver structure. Due to the near field coupling of the transmitter and receiver structure, a signal can be propagated without substantial loss.

In some cases, a wave guide can be formed of a number of constituent wave guides each capable of independently propagating a corresponding electromagnet wave. However, in order to prevent cross talk (i.e., leakage) between adjacent layers, electromagnetic energy must be directed back towards the propagating layer. This can be accomplished by isolating adjacent propagating layers from each other using an intervening layer. In one embodiment, stepped indices of refraction can be used. For example, a first propagation layer can be separated from a second, adjacent, propagation layer by an intervening layer. In one embodiment, the first propagation layer can be formed of material having a first dielectric coefficient (D1)) and the intervening layer can be formed of a dielectric having a second dielectric coefficient (D2), where D1>D2. The intervening layer can also be formed of metal or have a metallic component (such as a coating) thereby providing an effective mechanism for reflecting incident electromagnetic energy back to the appropriate propagation layer. In this way, cross talk between the first and second propagation layers can be eliminated or greatly reduced since the electromagnetic energy in the first and second propagation layers will be reflected back within the respective layers without leaking out. The dielectric wave guide can be built with multiple passes of an extrusion process, or stages of an extrusion process, where the cross section of each dielectric layer can be designed much more easily than metallic air filled guide. This allows the propagating modes of the guide to be custom designed for the requirements of a particular application.

In another embodiment, the flexible wave guide can be cylindrical in shape thereby conforming to existing form factors associated with a conventional practical cable or fiber optic cables. In this way, the cylindrical wave guide can be used in legacy applications as a replacement of a cable. The cylindrical wave guide can be partitioned into arc segments. The arc segments can be isolated from each other to form independent communication channels suitable for carrying data. In one embodiment, the cylindrical wave guide can have an annular shape with a hollow core. The hollow core can take the form of air gap. In this way, air within the air gap can form an isolating dielectric region. In one embodiment, the cylindrical wave guide can be configured as a ring antenna having a first cylindrical portion and a second cylindrical portion. In this embodiment, the first cylindrical portion can be partitioned into first and second arc segment that are isolated Thorn each other in such a way that a signal from the first arc segment can propagate directly to a selected first part of the second cylindrical portion. Similarly, a signal from the second arc segment can propagate directly to a selected second part of the second cylindrical portion. In either case, suitable use of an isolation layer can prevent substantial cross talk and reduced signal loss.

These and other embodiments are discussed below with reference to FIGS. 1-11. However, those skilled in the art will readily appreciate that the detailed description given herein with respect to these figures is for explanatory purposes only and should not be construed as limiting.

FIG. 1 illustrates data transport system 100 in accordance with the described embodiments. System 100 can include communication channel 102 capable of carrying data from data source 104 to data sink 106. In the described embodiment, the data can be encoded with electromagnetic energy having a carrier frequency that ranges from sub-THz to THz (about 60 GHz to several hundred GHz) with an associated wave length of no more than about 5 mm (corresponding to a minimum carrier frequency of about 60 GHz). It should be noted that system 100 can be incorporated into communication devices and computing devices including portable computing devices along the lines of a laptop. Communication channel 102 can be implemented using a physical medium arranged to act as guide for the propagation of the electromagnetic wave. Accordingly, the wave guide can have various shapes and be formed of various materials. For example, the wave guide can be rectangular, square, and cylindrical and so forth. The wave guide can be formed of a dielectric material, metal, or a combination of both. The wave guide can be formed of individual metallic conductors connected together by dielectric couplers, dielectric segments connected together by dielectric couplers, and so on. For example, an electromagnetic wave propagating in a dielectric wave guide to coplanar dielectric wave guide coupler can induce a voltage differential on conductive traces of the coplanar wave guide that can be interpreted as a signal by an external circuit.

It should be noted that a near field configuration is characterized as distances corresponding to sub-wavelength to a few wavelengths, and as such, the electromagnetic wave can propagate without a wave guide. For example, the electromagnetic wave can propagate over an air gap having a dimension in accordance with near field coupling of a transmitter that radiates the electromagnetic wave and a receiver that captures the electromagnetic wave. Accordingly, communication channel 102 can be implemented in a near field configuration by which it is meant that a transmitter can radiate electromagnetic energy over free space a distance of at most a few wave lengths and captured by a receiver without substantial loss. The free space can take the form of an air gap over which the electromagnetic energy can radiate. In accordance with near field coupling effects, a receiver can couple with the transmitter to capture most of the electromagnetic energy.

In other scenarios, a physical medium can be used as a wave guide arranged to direct the propagation of the electromagnetic energy. The wave guide can be formed of, for example, a dielectric material that can be either flexible or rigid. In one embodiment, the flexible wave guide can be formed of polymeric material, such as plastic, and have dimensions suitable for propagating electromagnetic energy in the appropriate carrier frequency range (at least 60 GHz to several hundred GHz and higher). The flexible nature allows wave guide 108 to bend and twist without substantial loss of signal integrity. Moreover, the structural integrity of the flexible material is not substantially affected by the number of twist events (but more by the duration of a single twist event). In this way, wave guide 108 formed of a flexible material is well suited for applications, such as a laptop, where it can be expected that wave guide 108 will undergo a substantial number of twist events (related to opening and closing the lid). Accordingly, the expected operational life of system 100 using wave guide 108 can be commensurate with that of the laptop.

Figure 2:
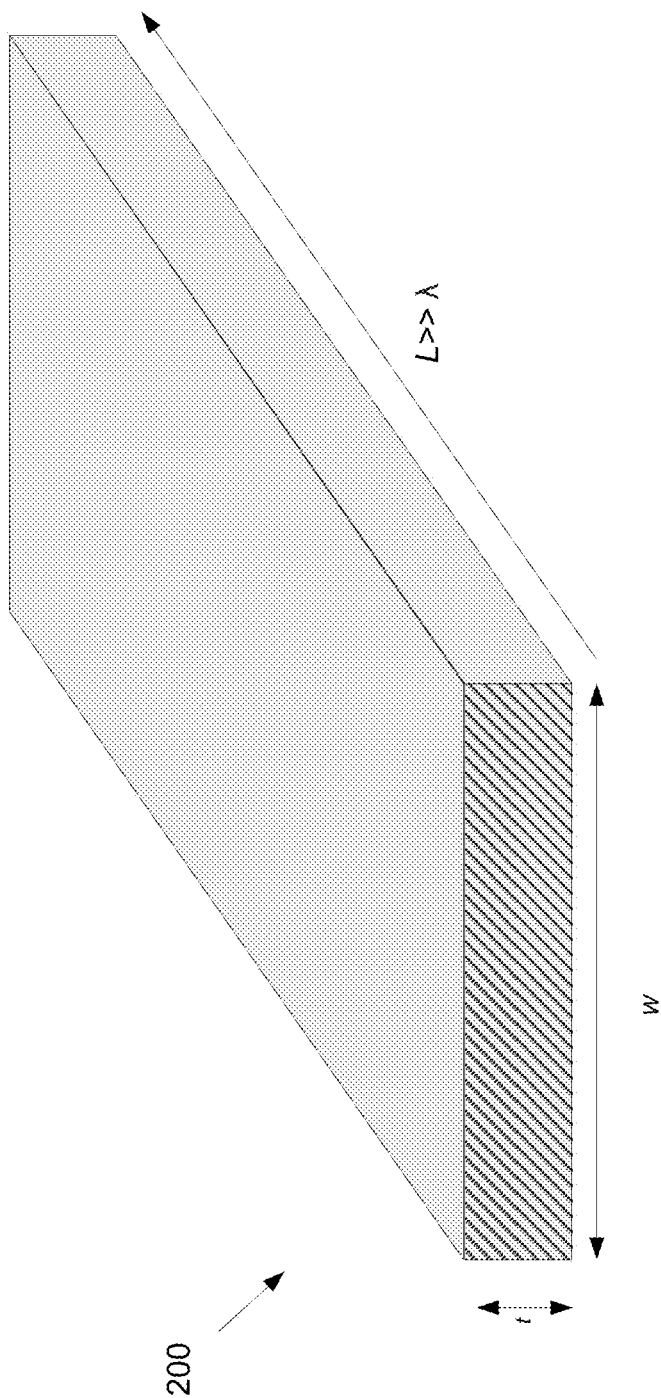
FIG. 2 shows an embodiment of a planar wave guide.
Figure 3:
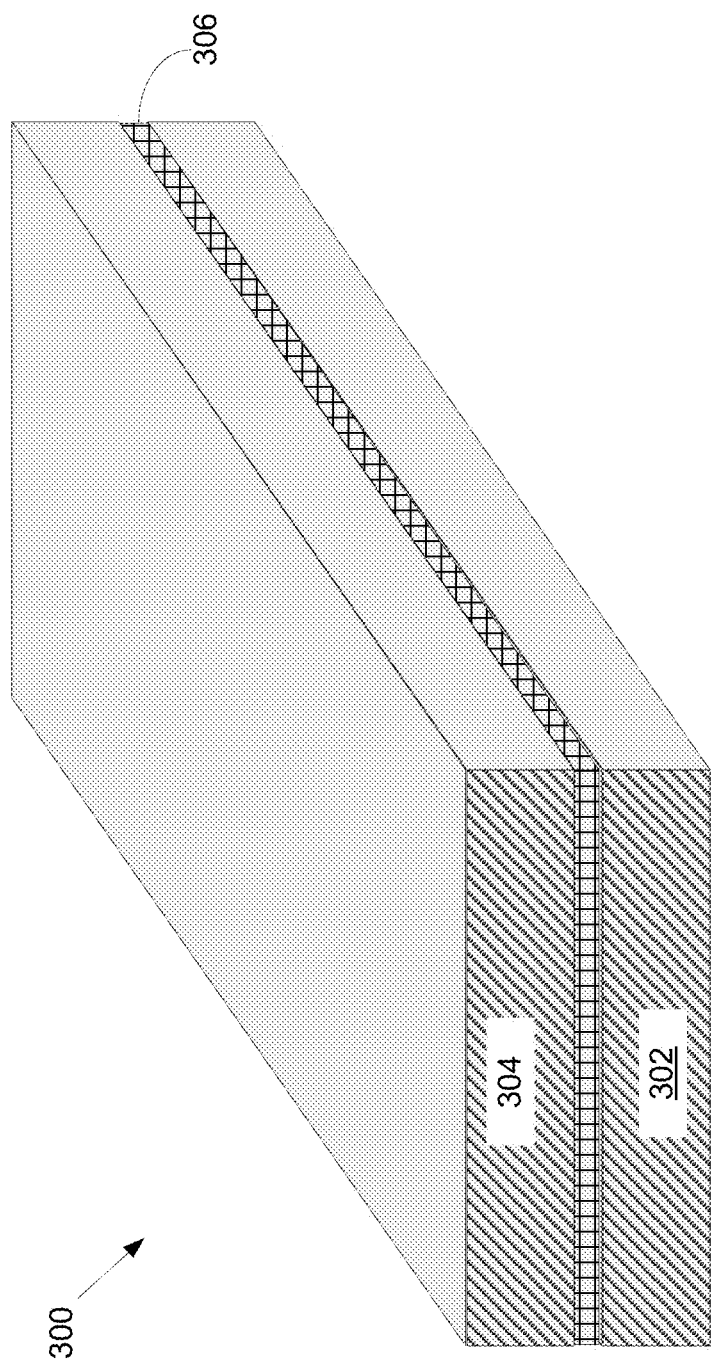
FIG. 3 illustrates a stacked wave guide in accordance with the described embodiments.

Wave guide 108 can be coupled to data source 104 at coupler 110 and data sink at coupler 112. Coupler 110 and coupler 112 can take many forms. Using the example of the laptop, when data source 104 is disposed within a base unit of the laptop and data sink 106 (in the form of a display, for example) is incorporated within a lid that pivots with respect to the base unit, wave guide 108 can move with respect to the base unit. In this case, coupler 110 can include a gap over which data can pass using electromagnetic energy radiated by an antenna coupled to data source 104. For example, coupler 110 can include a receiver that can near field couple to a transmitter(s) that receives data from data source 104. In one embodiment, the gap separating the receiver transmitter(s) can be on the order of a few wavelengths allowing for the near field coupling between the receiver and transmitter(s). In this way, electromagnetic energy radiated by the transmitter(s) can be subsequently captured by the receiver without suffering substantial loss. By allowing the transmitter to couple with the receiver without physical contact, the receiver can freely move within the gap with respect to the transmitter(s). On the other hand, since display 106 remains fixed within the lid, coupler 112 can also remain fixed with respect to display 106 (or more specifically display circuitry, such as a timing controller, or TCON). Accordingly, wave guide 108 can be physically connected to appropriate circuitry within the lid using, for example, a lap joint, substrate integrated wave guide to coplanar wave guide coupler, or any other appropriate low loss connection. FIG. 2 shows an embodiment of wave guide 108 in the form of planar wave guide 200. Planar wave guide 200 can have a rectangular (or square) cross-section with width W and thickness t.

In some embodiments, wave guide 108 can have can be arranged in such a way that signals can propagate independently of each other. For example, in the arrangement shown in FIG. 3, stacked wave guide 300 can include multiple wave guide layers 302, 304 separated by isolation layer 306. In order to prevent cross talk between wave guide layers 302 and 304, isolation layer 306 can be used to re-direct electromagnetic energy at the interfaces between layers 302/304 and layer 306 back into the appropriate propagation layer. In one embodiment, re-directing of incident energy at the interface can be accomplished using what is referred to as a stepped index of refraction profile. A stepped index of refraction profile is a refractive index profile characterized by a uniform refractive index (D1) within a primary propagation layer and a decrease in refractive index (D2) at the isolation layer interface (i.e., the isolation layer is formed of a material having a lower refractive index than the primary propagation layer). In other words, layer 302 and layer 304 will each be formed of material having refractive indices (D1, D2, respectively) that is uniform within the respective layers but greater than the refractive index (D3) of the material used to form isolation layer 306. It should be noted however, that in some cases, isolation layer 306 can be formed of, or include, metal that can provide effective shielding between layers 302 and 304. In addition to providing effective shielding, metal within isolation layer 306 can be used to provide a conductive path that can be used to carry power. It should be noted that two (or more) different bands can be used to support data flow in opposite directions, or to support multiple independent channels, and to increase overall all bandwidth, for example within, a given wave guide structure.

In addition to a planar form factor, wave guide 108 can take a cylindrical shape as shown in FIG. 4A illustrating cylindrical wave guide 400. By taking on a cylindrical shape, wave guide 400 can be used with legacy designs that rely upon optical of practical cables (or wires). For example, wave guide 400 can be used to replace practical cables in clutch assemblies used in laptops. As shown in FIG. 4A and in cross section in FIG. 4B, wave guide 400 can include arc segment 402 and arc segment 404. Isolation layers 406 and 408 can be used to prevent cross talk between arc segments 402 and 404. In this way, (and similar to stacked wave guide 300) wave guide 400 can be adapted to transmit signals at different carrier frequencies. For example, different carrier frequencies can be used in different arc segments to improve isolation between arc segments. Generally speaking, the use of different carrier frequencies is typical for performing a full duplex operation over the same channel. For example, arc segment 402 can be optimized to transmit signals having a carrier frequency of about 60 GHz, while arc segment 404 can be optimized to transmit signals having a carrier frequency of about 80 GHz.

In some embodiments, wave guide 400 can be a duplex interconnect coupling a first active circuit and a second active circuit. In this way, arc segment 402 can transmit a first signal at a first carrier frequency from a first transmitter circuit to a corresponding receiver circuit concurrently with arc segment 404 transmitting a second signal at a second carrier frequency from a second transmitter circuit to a second receiver circuit. To avoid interference between the first and second signals, layers 406 and 408 can be used separate and isolate the arc segments 402 and 404. Gap 410 can include a dielectric that further provides signal isolation. For example, gap 410 can take the form of an air gap. As with stacked wave guide 300, arc segments 402 and 404 can have a stepped index of refraction profile with respect to layers 406 and 408.

FIG. 4C illustrates another variation of cylindrical wave guide 400 in the form of wave guide 430. More particularly, wave guide 430 illustrates additional signal paths can be implemented using arc segments 402 and 404 divided into arc segments 402-1, 402-2 and 404-1, 404-2, isolated from each other by layers 406-1, 2 and 408-1.2, respectively. FIGS. 4D and 4E illustrates another implementation of cylindrical wave guide 400 in the form of rotational switch 450 (also referred to as a ring antenna). Rotational switch 450 can be arranged in such a way that arc segments 452 and 454 can be shielded from each other using dielectric layers 456 and 458 (as well as a central air gap). However, arc segment 452 can be coupled to outer layer 460 whereas arc segment 454 can be shielded from outer layer 460. In this way, signal S at outer layer 460 can be passed from outer layer 460 to arc segment 452 and not arc segment 454 (since arc segment 454 is effectively isolated from outer layer 460). In the described embodiment, arc segment 452 can be pass signal S to section 462 of cylindrical wave guide 450.

FIG. 4F illustrates a further embodiment of a cylindrical wave guide arrangement in the form of a coaxial cable/wave guide 470. In particular, coaxial cable 472 can be centrally located and can be configured to carry DC power. Radially outward from coaxial cable 472, wave guides 474 and 476 (isolated by isolation layers 478) can be configured to propagate electromagnetic energy suitably encoded with appropriate data in a manner described above. Furthermore, DC ground layer 480 can be located radially outward from wave guides 474 and 476 that, in turn, is surrounded by a protective layer in the form of outer jacket 482. Accordingly, coaxial cable/wave guide 470 can have many uses, such as providing a high speed data channel in addition to a DC power channel in a space efficient configuration.

Figure 4G:
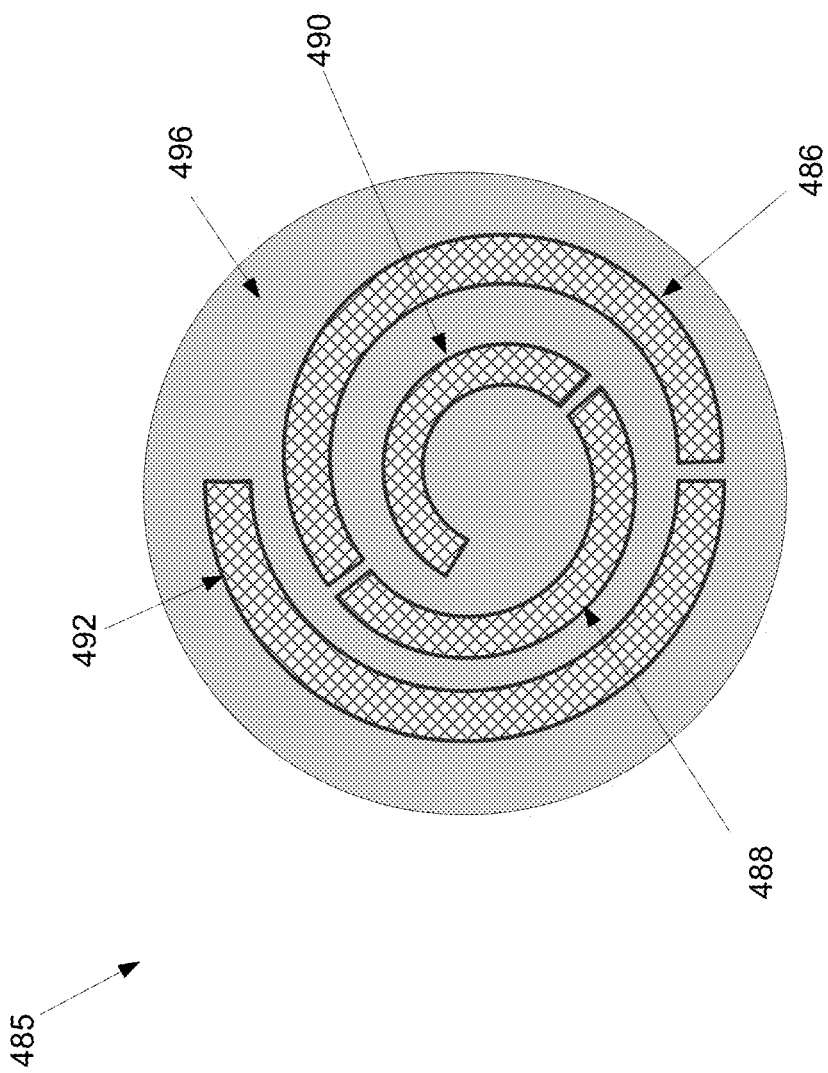

FIG. 4G shows another embodiment of a cylindrical wave guide in the form of rolled wave guide 485 in which a number of flexible wave guides are wrapped in a form referred to rolled wave guide within a protective layer. More specifically, rolled wave guide 485 can include flexible wave guides 486, 488, 490, and 492 in a wrapping configuration within a protective layer in the form of outer jacket 494. The wave guides can be embedded within isolation layer 496 preventing cross talk between the wave guides. In some embodiments, however, selected wave guides can be coupled in such a way as to permit propagation of the electromagnetic energy there-between.

The following discussion relates to a specific implementation of a flexible wave guide that facilitates high speed data transmission in a portable computing device. As discussed below, the portable computing device takes the form of a laptop. It should be noted, however, that embodiments of the flexible wave guide can be well suited for any application requiring high speed data transport.

Figure 5:
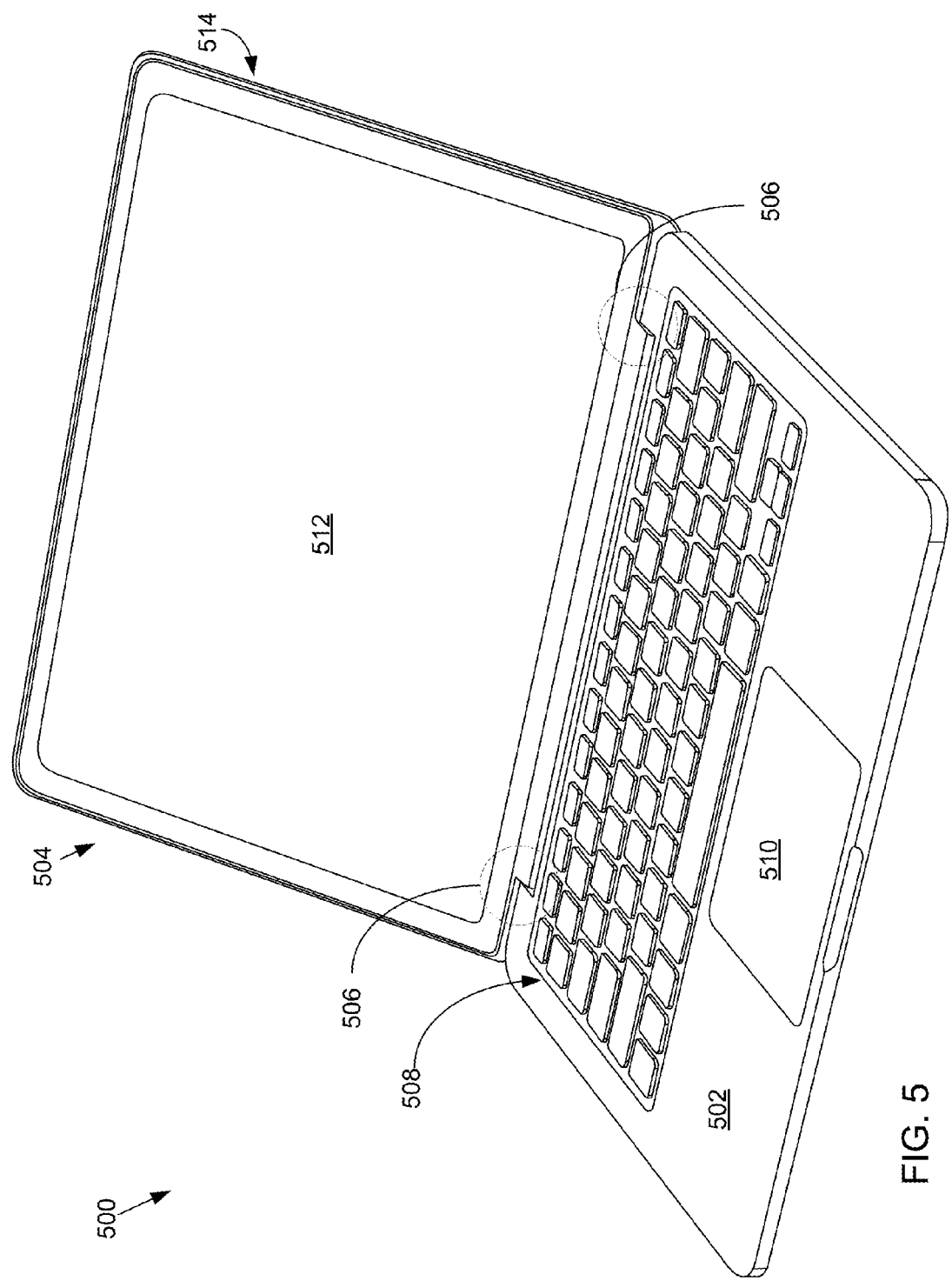
FIG. 5 shows a front facing perspective view of an embodiment of representative portable computing device in the form of laptop.

FIG. 5 shows a front facing perspective view of an embodiment of representative portable computing device 500 in the form of laptop 500. Laptop 500 can include base portion 502. Base portion 502 can be pivotally connected to lid 504 by way of clutch assembly 506 hidden from view by a cosmetic wall. Base portion 502 can have an overall uniform shape sized to accommodate clutch assembly 506. Bottom portion 502 can be configured to accommodate various user input devices such as keyboard 508 and touchpad 510. Lid 504 can be moved with the aid of clutch assembly 506 from the closed position to remain in the open position and back again. Lid 504 can include display 512 and rear cover 514 that can provide structural support to display 512. Display 512 can present visual content such as a graphical user interface, still images such as photos as well as video media items such as movies. Display 512 can display images using any appropriate display technology. Base portion 502 can include various operational components at least one of which can provide image data for presentation by display 512. Accordingly, those circuits within base portion 502 configured to provide image data (such as high resolution video data) can be electrically coupled to display circuits associated with display 512.

For example, although not shown, base portion 502 can include a graphics processing unit (also referred to as GPU) configured to generate image data in the form of pixel data. In order to present the pixel data in the form of an image(s), the pixel data can be provided to a display support circuit (such as a timing controller, or TCON). In order to provide sufficient pixel data at data rates required by the TCON for proper presentation by display 512, a high speed data communication channel can be used. In one embodiment, the high speed data channel can take the form of a flexible wave guide configured to provide a transport medium for electromagnetic energy having wavelengths in the range of sub-millimeter to a few millimeters. In another embodiment, the high speed data channel can rely upon near field coupling effects by which it is meant that an antenna structure at base unit 502 can radiate the electromagnetic energy over free space a distance of less than a wavelength to a few wavelengths for capture by a receiver structure at lid 504. For example, the high speed data channel can include a transmitter antenna coupled to the GPU and a receiver antenna coupled to the TCON separated from each other by an air gap between base unit 502 and lid 504.

Figure 6A:
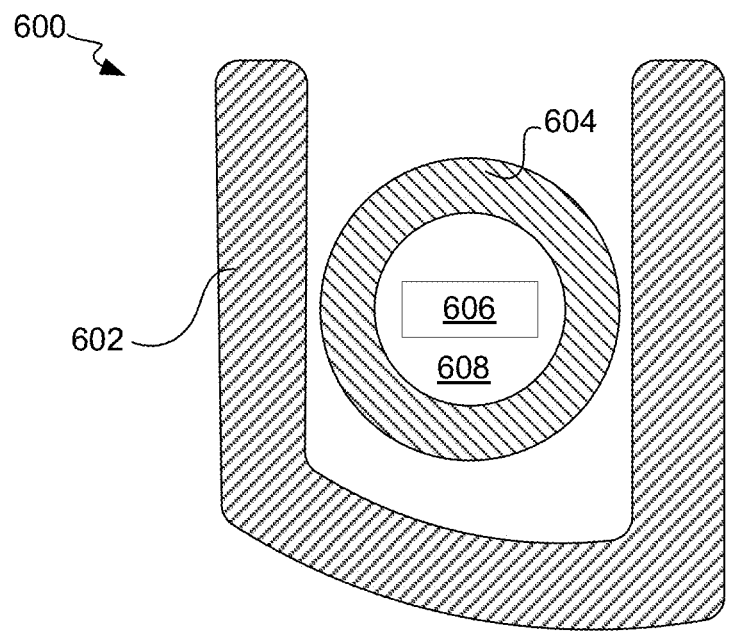
FIGS. 6A and 6B show a representative clutch/wave guide assembly in accordance with the described embodiments.

Turning next to FIG. 6A, an exemplary hinge mechanism having a hollow clutch according to one embodiment of the present invention is shown in side cross-sectional view. Hinge mechanism 600 can include an outer clutch barrel 602 as well as an internal clutch 604 allowing for wave guide 606 through cavity 608 therethrough. In some embodiments, clutch 604 can be cylindrical in nature and can have an annular outer region and a central bore region surrounded by the annular outer region. Again, the central bore region is adapted to permit the passage of and provide support for one or more wave guides adapted to provide a communication channel configured to connect base portion to a lid of a portable computing device. In one example, the radius of a cylindrical clutch can be about six millimeters. It should be noted therefore, the sufficient room exists within clutch 604 to accommodate a wave guide having lateral dimensions up to about 5 millimeters. In those embodiments where the wave guide is cylindrical, a diameter of about 5 millimeters can be accommodated. As mentioned above, a wave guide having lateral dimensions of about 5 mm can be used to provide a transmission medium of electromagnetic energy in the range of about 60 GHz. It should be noted that rotation of the lid and base unit results in slight twisting of wave guide with little or no adverse affect on data transmission through the wave guide.

Figure 6B:
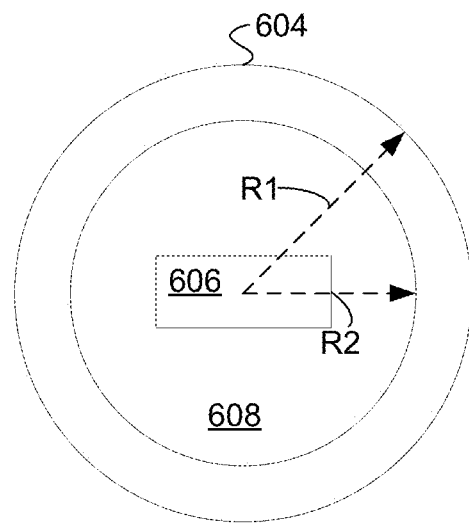

Continuing with FIG. 6B, the exemplary hollow clutch of FIG. 6A is illustrated in side cross-sectional view according to one embodiment of the present invention. Clutch 604 can be formed of any suitable material such as stainless or alloy steel having outside radius $R_1$ and inside radius $R_2$. In the described embodiment, inside radius $R_2$ can vary to provide sufficient space to accommodate a wave guide having any suitable form factor. As noted above, wave guide 606 can include a plurality of layers arranged in a planar, stacked, or cylindrical (with central air gap or solid, straight cylinder or spiral about an axis) to provide a high speed communication channel electrical components in the lid, such as a display assembly, and base portion. In some embodiments, a separate power line can be provided whereas in other cases, a metallic isolation layer can be used to provide both a power conduit and signal isolation for wave guide 606. In this way, both power and data can be passed between lid 504 and base unit 502 in a unified arrangement.

Figure 7:
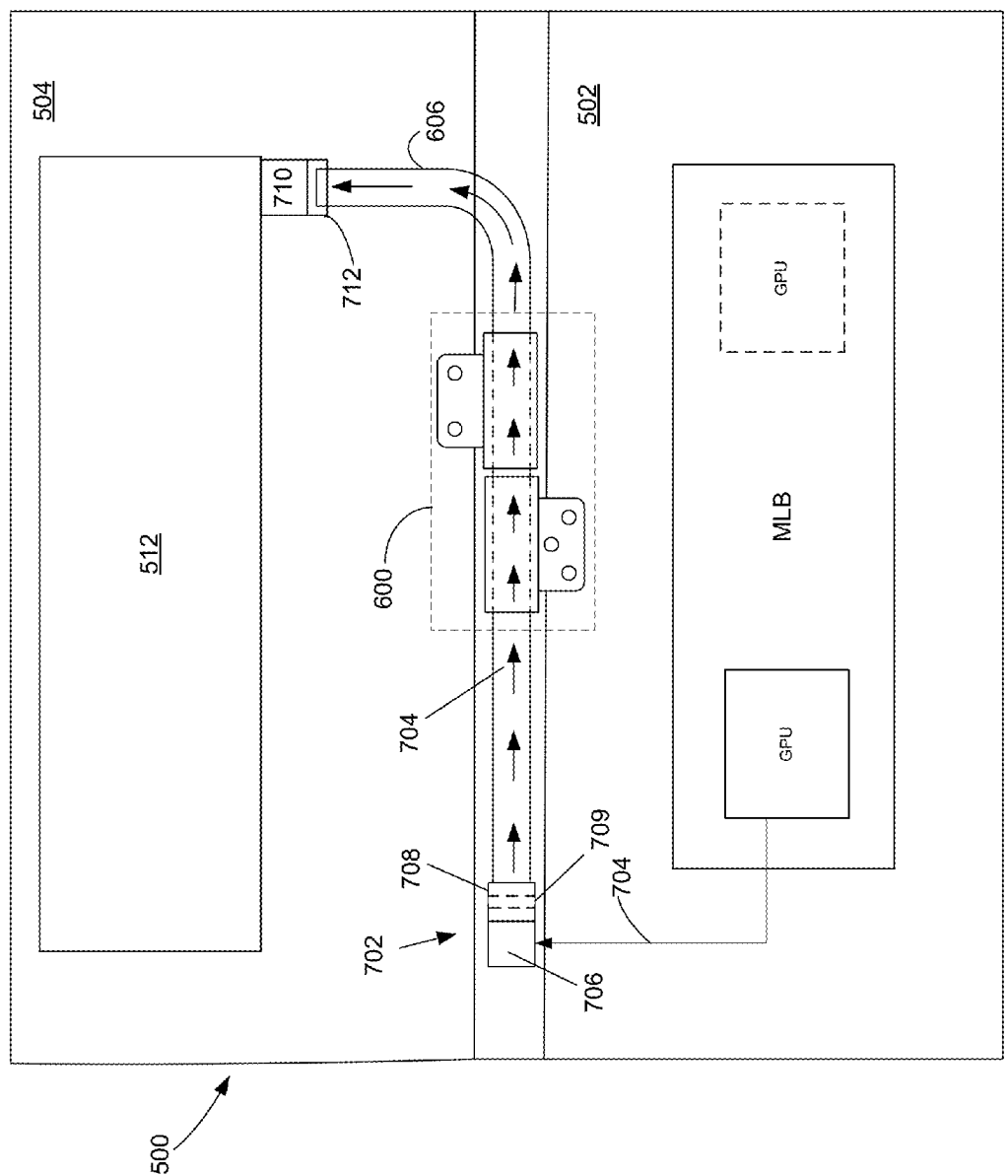
FIG. 7 shows a top down view of a portable computing device.

FIG. 7 shows a top down view of portable computing device 500 highlighting the relationship between wave guide 606, clutch assembly 600, and operational components within base unit 502 and lid 504. More specifically, representative components within base unit 502 can include a main logic board (MLB) on which can be located a video source, such as (one or more) GPU. As shown, the GPU can be in communication with coupler 702 having transmitter region 706 arranged to pass electromagnetic energy encoded with video data 704 to wave guide 606 by way of receiver region 708. In the described embodiment, coupler 706 can include gap 709 having dimensions that are small when compared to those of wave guide 606. In one embodiment, gap 709 can facilitate near field coupling of transmitter region 706 and receiver region 708. In some cases, transmitter region 702 can be disposed axially with regards to wave guide 606. Video data 704 can be encoded in a carrier wave that is propagated by wave guide 606 to display circuit 710. In one embodiment, coupler 712 can be used to couple wave guide 606 to display circuit 710. For example, display circuit 710 can take the form of timing controller (TCON) 710 arranged to receive pixel data generated by the GPU and encoded in a carrier wave propagated over wave guide 606. TCON 710 can then process video data 704 for presentation by display 512. It should also be noted that any longitudinal overlap between transmitter 702 and receiver 706 of coupler.

Figure 8:
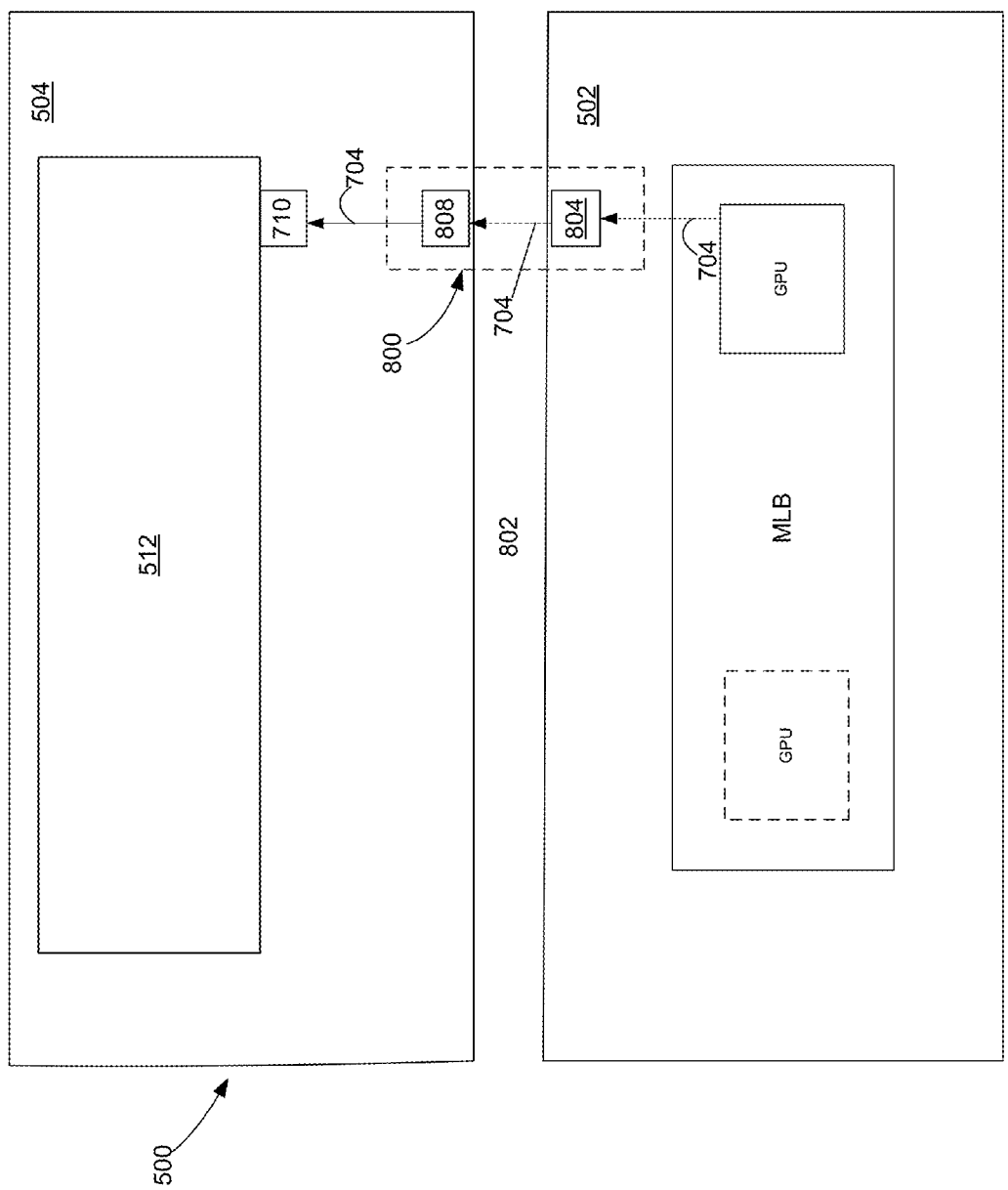
FIG. 8 illustrates yet another embodiment of a communication channel in the form of a near field communication channel that utilizes electromagnetic energy having a carrier frequency in the sub-terahertz to terahertz range.

FIG. 8 illustrates communication channel 102 in the form of near field communication channel 800 that utilizes electromagnetic energy having a carrier frequency in the sub-terahertz (s-THz) to terahertz range (e.g., 60 GHz and up) to transport video data 704 encoded therein. More specifically, transmitter unit 802 can transmit electromagnetic energy having encoded video data 704 across air gap 802. Video data 704 can be encoded using any number of appropriate encoding schemes. Encoding schemes can include amplitude shift keying, angle modulation (phase or frequency), vector modulation (amplitude and phase combined) as well as other modulation schemes known the art. In any case, the electromagnetic energy having the encoded video data 704 can be received at receiver unit 808 coupled to video circuit 710 (such as TCON 710).

Figure 9:
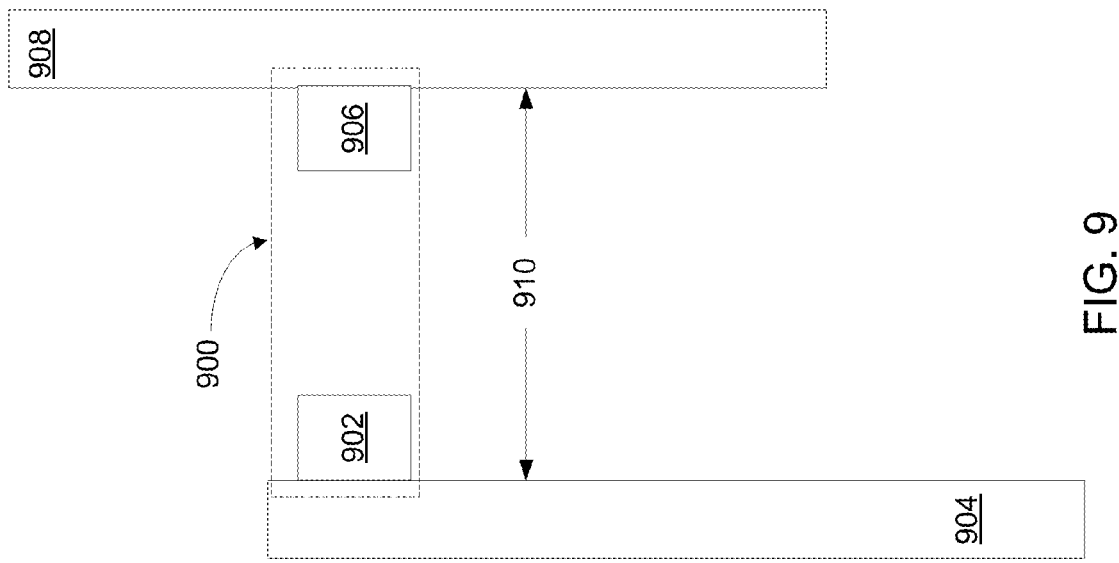
FIG. 9 shows a near field connection scheme for use in a portable computing device.

In addition to providing a high speed data channel well suited for use in portable computing devices, near field transmission of electromagnetic energy can be used in stationary computing systems, such as a desktop computer or associated circuitry. For example, FIG. 9 shows a representative near field connection scheme 900 well suited for passing data from circuit 902 on printed circuit board (PCB) 904 to circuit 906 on printed circuit board 908 over air gap 910. In one embodiment, data can be encoded over a carrier wave with a carrier frequency in the range of sub-THz to THz providing sufficient bandwidth to support a high resolution video presentation. Near field data transport can be used to provide a more efficient and less time consuming assembly procedure for desktop computers.

Figure 10:
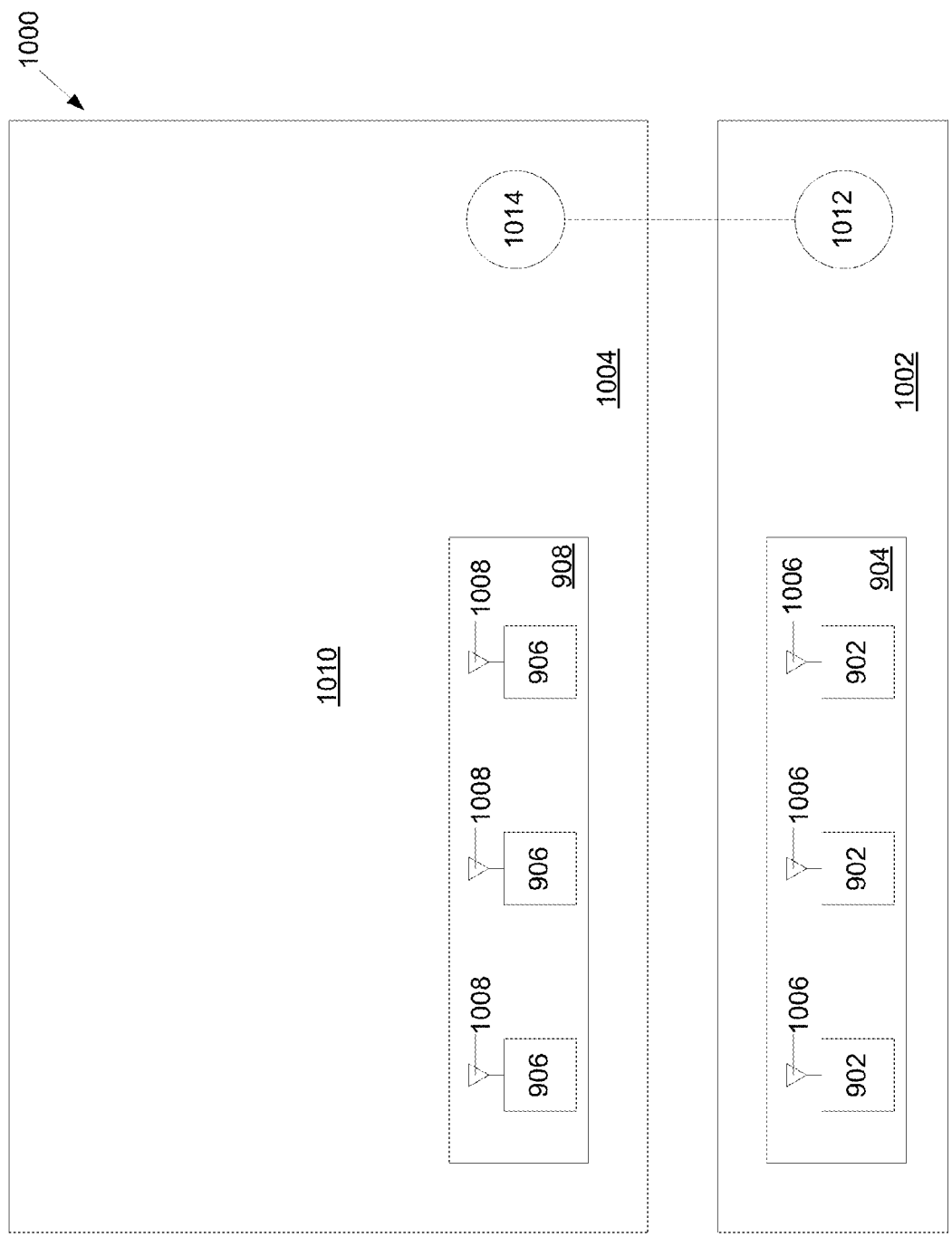
FIG. 10 shows a near field connection scheme for a stationary computing device.

For example, as shown in FIG. 10 showing system 1000, PCB 904 can be incorporated as part of circuit module 1002 that can be wirelessly coupled with circuit module 1004 in an electronic system. Circuit module 1002 can include circuits 902 each having associated transmitter 1006 suitable for transmitting Electromagnetic energy having a carrier frequency of at least 60 GHz. On the other hand, circuit module 1004 can include PCB 908 having circuits 906 each having associated receivers 1008 suitable for receiving the electromagnetic energy transmitted by transmitter 1006. In one embodiment, circuit module 1002 can include circuits, such as a GPU, that can provide video data whereas circuit module 1004 can include video data processing circuits (such as TCON) used support display 1010. In some embodiments, a power connection can be established separate from the near field high speed data connection using, for example, spring contact 1012/1014.

Assembly of system 1000 can be carried out simply by placing circuit module 1002 into a pre-designated position relative to circuit module 1004 and securing into place. For example, in the case where system 1000 is a stationary computing system, display 1010 can be secured within a housing. A near field data transport channel using Electromagnetic energy in the sub-THz to THz range can be formed by placing circuit module 1002 into position within the housing relative to circuit module 1004 forming an air gap of pre-determined size between transmitter(s) 1006 and receivers 1008. Accordingly, high speed data can pass from circuit module 1002 to circuit module 1004 without the need for time consuming and expensive wiring. However, in those situations where a power channel separate from the data channel is desired, power contact 1012 can be brought into physical contact with power contact 1014. In one embodiment, power contact 1012 (or power contact 1014, or both) can take the form of a spring contact that can be easily brought into proximity with power contact 1014 during the placement of circuit module 1002 within the housing.

Figure 11:
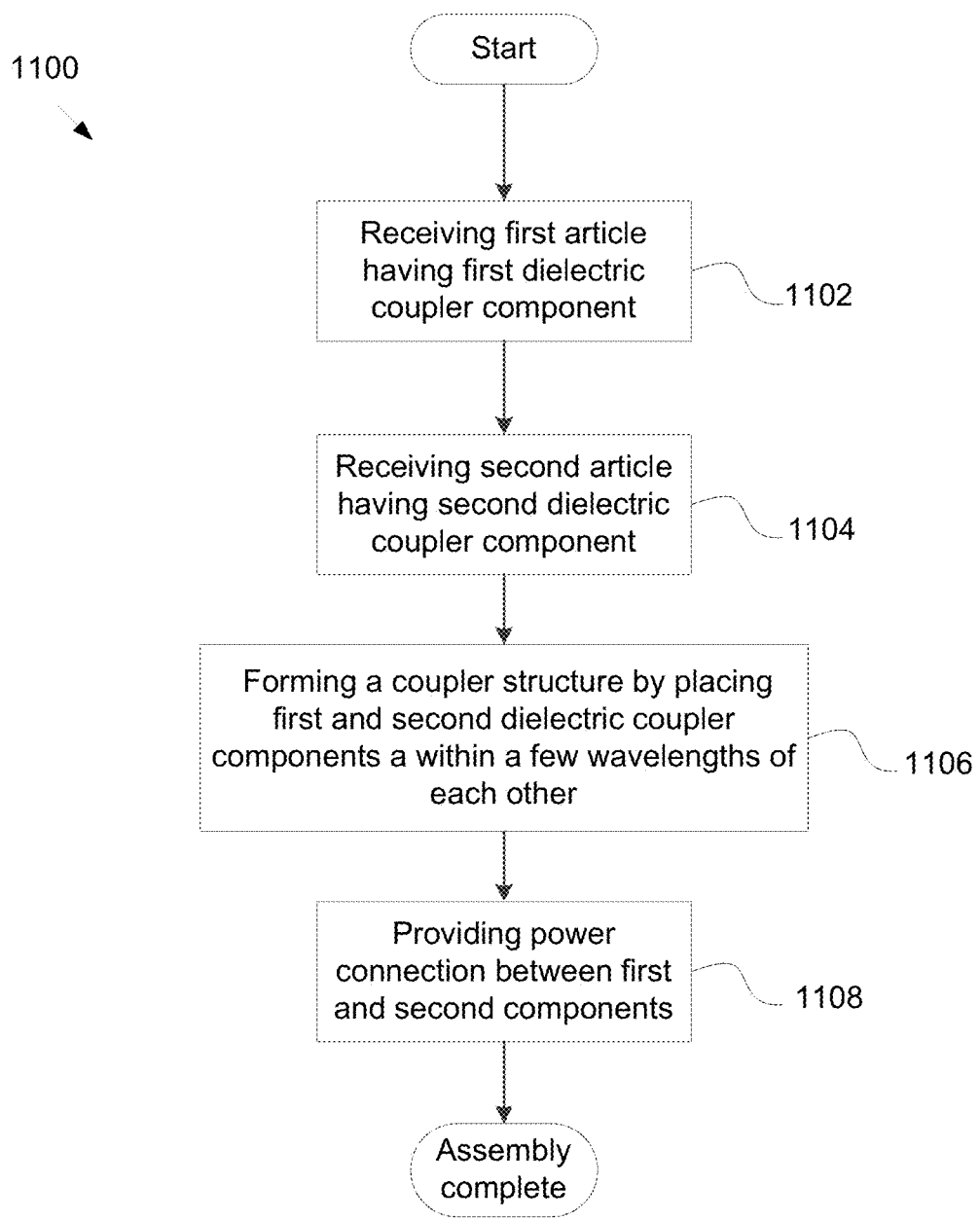
FIG. 11 shows a flow chart detailing a process in accordance with the described embodiments.

FIG. 11 shows a flowchart detailing assembly process 1100 in accordance with the described embodiments. Assembly process 1100 can be used to simplify and reduce the number of assembly operations required to manufacture a computing system by reducing, or in some cases, eliminating wired connections in the computing system. The wired connections in particular that can be eliminated are those used to provide a high speed data connection between electrical components. The wired connections can be replaced by near field coupled components over which electromagnetic energy having a carrier frequency of at least 60 GHz to at least several hundred GHz can propagate without substantial loss. Process 1100 can embody a first article having a first wave guide connected to a first dielectric coupler component and a second article having second wave guide connected to a second dielectric coupler component. It should be noted that using near field coupling effects, the first dielectric coupler component can be configured to radiate electromagnetic energy that can be captured by the second dielectric coupler component (and vice versa) over distances of less than a few wavelengths. A communication channel can be formed between the first and second wave guides. In one embodiment, the communication channel can be formed by placing the first and second articles in proximity to each other such that the first and second dielectric coupler components are within less than a few wavelengths of each other. In this way, a coupler structure can be formed that utilizes near field coupling of the first and second dielectric coupler components to propagate the electromagnetic energy. Accordingly, a communication channel formed of the first and second wave guides can be formed without the need of conventional wiring. Using this approach, an assembly process that requires a forming the communication channel between the first and second articles can be carried out without the need for discrete wires resulting in a substantial improvement in the overall manufacturing process.

Process 1100 can be used in the assembly of an article of manufacture. The article of manufacture can include a number of components that can be assembled together during an assembly process. Process 1100 can embody a first article having a first wave guide connected to a first dielectric coupler component and a second article having second wave guide connected to a second dielectric coupler component. Process 1100 can be executed by carrying out at least the following operations. At 1102, the first article is received and at 1104, the second article is received. At 1106, the first and second dielectric coupler components are brought within a few wavelengths of each other forming a coupler structure. The coupler structure links the first and second wave guides in such a way that electromagnetic energy can propagate between the first and second articles in a communication channel. In some cases, a power channel separate from the communication channel is formed at 1108.

The described embodiments have many advantages. For example, communication paths (such as between a GPU and TCON described above) can be accomplished using a single wave guide even with advanced displays requiring high data rates. In this way, much simpler assembly methods can be used. For example, using sophisticated CMOS circuits can be used to transmit (at the GPU side) and receive (at the TCON side) the signal. Moreover, the integration of the transmit physical layer and the receive physical layer (vis a vis optics) <optics has the additional benefit of reducing the number of non-CMOS having the benefit of reduced part count, reduced cost, reduced area and reduced power requirements. For example, the power saved can be used to provide additional power to the transmitter and receiver physical layers. It should also be noted that a carrier based system, with QAM modulation, for example, can be trained at run time to optimize the use of the communication channel (dielectric wave guide, couplers etc.) to continue to work well even if the system varies somewhat as it ages, or under different environmental conditions. It should be noted that orthogonal modes can allow more information transfer over a given structure. It is also feasible to have it adapt during use if required to maintain robust data transport. It can also be noted that when compared to free space applications, the use of a private wave guide limits interference exposure, allows for multiple lanes in close proximity, if desired, with the employment of suitable isolation between channels (which is not possible with free space techniques). Furthermore, polarization methods can be used to create orthogonal channels in the same medium, where the wave guide supports the polarization propagation.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A data transmission system for use in a portable computing device, the data transmission system comprising:
    a near field transmitter circuit (NFTC) configured to transmit an electromagnetic signal encoded with data, the electromagnetic signal having a carrier frequency of at least 60 GHz;
    a receiver circuit that is configured to receive the data transmitted by the NFTC; and
    a wave guide (i) configured as a transport medium for the electromagnetic signal encoded with the data and (ii) disposed within a central bore of a hinge assembly that is configured to pivotally couple an enclosure of the NFTC and an enclosure of the receiver circuit.

2. The data transmission system as recited in claim 1, wherein the enclosure of the receiver circuit is connected to a display panel that is configured to pivot about the central bore of the hinge assembly.

3. The data transmission system as recited in claim 1, wherein the wave guide is a flexible wave guide configured to twist simultaneous to a pivoting motion of the hinge assembly.

4. The data transmission system as recited in claim 1, wherein the wave guide is formed of flexible material and comprises multiple dielectric layers.

5. The data transmission system as recited in claim 1, wherein the electromagnetic signal is an optical signal.

6. The data transmission system as recited in claim 1, wherein the wave guide comprises at least one isolation layer that extends through a length of the central bore.

7. The data transmission system as recited in claim 1, wherein the wave guide comprises an air gap configured to reduce interference between different layers of the wave guide.

8. A portable computing device, comprising:
    a hinge assembly that pivotally couples a first enclosure for a near field transmitter circuit (NFTC) and a second enclosure for a receiver circuit;
    the NFTC configured transmit an electromagnetic (EM) signal encoded with data, the EM signal having a carrier frequency of at least 60 GHz;
    the receiver circuit configured to receive the data transmitted by the NFTC; and
    a wave guide disposed within a cavity of the hinge assembly, wherein the wave guide is configured to transmit the EM signal between the NFTC and the receiver circuit.

9. The portable computing device as recited in claim 8, wherein the wave guide is configured to twist within the cavity when at least one of the first enclosure and the second enclosure pivots about the hinge assembly.

10. The portable computing device as recited in claim 8, wherein the data is further transmitted from a graphical processing unit (GPU).

11. The portable computing device as recited in claim 10, wherein the GPU transmits the data as pixel data for display at a display panel connected to the second enclosure.

12. The portable computing device as recited in claim 8, wherein the wave guide comprises at least one isolation layer that extends through a length of the cavity.

13. The portable computing device as recited in claim 8, wherein the wave guide is planar.

14. The portable computing device as recited in claim 13, wherein the wave guide comprises a plurality of planar dielectric layers in a stacked arrangement.

* * * * *